US008040370B2

(12) United States Patent
Saishu

(10) Patent No.: US 8,040,370 B2
(45) Date of Patent: Oct. 18, 2011

(54) STEREOSCOPIC IMAGE DISPLAY APPARATUS HAVING STEREOSCOPIC PIXEL WITH APPROXIMATELY SQUARE SHAPE AND STEREOSCOPIC IMAGE DISPLAY METHOD

(75) Inventor: Tatsuo Saishu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1328 days.

(21) Appl. No.: 11/387,921

(22) Filed: Mar. 24, 2006

(65) Prior Publication Data

US 2006/0227208 A1  Oct. 12, 2006

(30) Foreign Application Priority Data

Mar. 24, 2005  (JP) ................................. 2005-086481

(51) Int. Cl.
*H04N 13/04* (2006.01)
(52) U.S. Cl. ......................................................... 348/51
(58) Field of Classification Search ....................... 348/51
See application file for complete search history.

(56) References Cited

U.S. PATENT DOCUMENTS

| 5,900,972 | A * | 5/1999 | Chikazawa | ................... 359/464 |
| 2004/0252374 | A1 | 12/2004 | Saishu et al. | |
| 2005/0099688 | A1* | 5/2005 | Uehara et al. | ................. 359/462 |
| 2005/0127357 | A1* | 6/2005 | Wong et al. | ..................... 257/59 |
| 2005/0259323 | A1 | 11/2005 | Fukushima et al. | |

FOREIGN PATENT DOCUMENTS

| JP | 2001-501073 | 1/2001 |
| JP | 2003-185968 | 7/2003 |
| JP | 2003185968 A | * 7/2003 |

OTHER PUBLICATIONS

Ebisawa, H. et al., "Development of 3D Display Using Modified 2D Arranged Light Source Arrays," 3D Image Conference 2003, pp. 177-180, (2003).
Saishu, T. et al., "53.3: Distortion Control in a One-Dimensional Integral Imaging Autostereoscopic Display System with Parallel Optical Beam Groups," SID 04 Digest, pp. 1438-1441, (2004).
Notification of Reasons for Rejection issued by the Japanese Patent Office on Jan. 16, 2009, for Japanese Patent Application No. 2005-086481, and English-language translation.

* cited by examiner

*Primary Examiner* — Jason Chan
*Assistant Examiner* — Usman Khan
(74) *Attorney, Agent, or Firm* — Finnegan, Henderson, Farabow, Garrett & Dunner, L.L.P.

(57) ABSTRACT

It is possible to prevent an image processing amount from increasing and obtain excellent display characteristics. A stereoscopic image display apparatus includes: a flat display device having approximately square pixels arranged on a flat display plane in a square manner: and an optical plate which is disposed in front of the display device and has optical apertures which extend linearly in the same direction as a diagonal line of a rectangle obtained by connecting n pieces of the pixels vertically, for controlling directions of light rays from the pixels. The flat display plane of the flat display device are divided to elemental images, each corresponding to each of the optical apertures in the optical plate, and an average value of pitches of the elemental images is larger than m (m=1,2,3 . . . ) times a length of a diagonal line of a rectangle obtained by connecting n pieces of the pixels laterally and the pitch of the optical apertures in the optical plate is equal to m times the length of the diagonal line of the rectangle obtained by connecting n pieces of the pixels laterally.

9 Claims, 17 Drawing Sheets

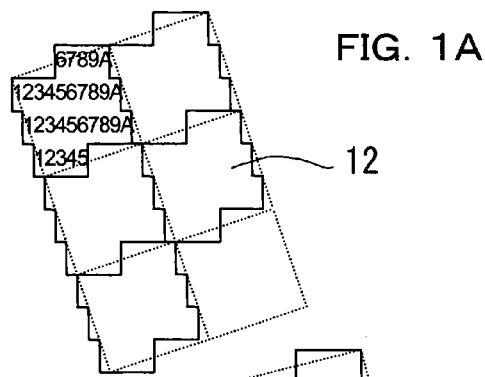
FIG. 1A
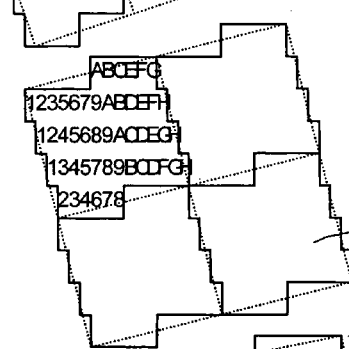
FIG. 1B
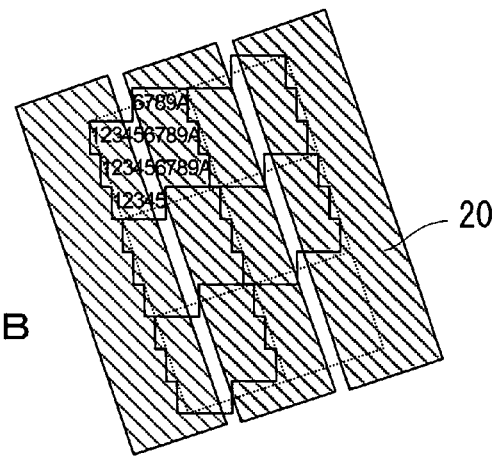
FIG. 1E
FIG. 1F
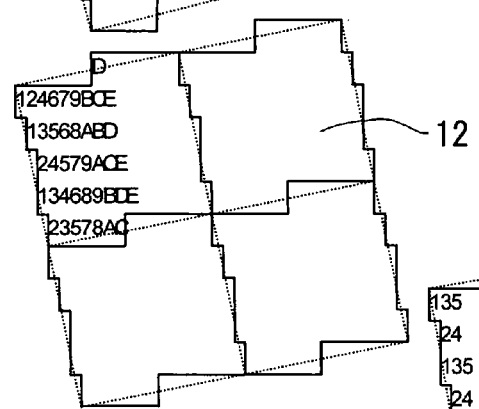
FIG. 1C
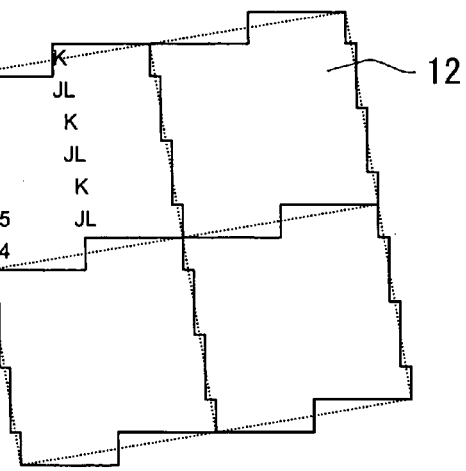
FIG. 1D

| | OPTICAL APERTURE IN OPTICAL PLATE | | | NUMBER OF PARALLAXES | |
|---|---|---|---|---|---|
| | INCLINATION ANGLE | HORIZONTAL CYCLE | CYCLE | THREE SUB-PIXELS | ONE SUB-PIXEL |
| n | (NUMERICAL EQUATION) [deg] | [SUB-PIXEL WIDTH] | [SUB-PIXEL WIDTH] | UNIT ALLOCATION | UNIT ALLOCATION |
| 2 | atan (1/2) 26.57 | 7.50 | 6.708 | 5 | 15 |
| 3 | atan (1/3) 18.43 | 10.00 | 9.487 | 10 | 30 |
| 4 | atan (1/4) 14.04 | 12.75 | 12.369 | 17 | 51 |
| 5 | atan (1/5) 11.31 | 15.60 | 15.297 | 26 | 78 |
| 6 | atan (1/6) 9.46 | 18.50 | 18.248 | 37 | 111 |
| n | atan (1/n) | $3n+3/n$ | $3\sqrt{n^2+1}$ | $n^2+1$ | $3(n^2+1)$ |

F I G. 6A

| | OPTICAL APERTURE IN OPTICAL PLATE | | | NUMBER OF PARALLAXES | |
|---|---|---|---|---|---|
| | INCLINATION ANGLE | HORIZONTAL CYCLE | CYCLE | THREE SUB-PIXELS | ONE SUB-PIXEL |
| n | (NUMERICAL EQUATION) [deg] | [SUB-PIXEL WIDTH] | [SUB-PIXEL WIDTH] | UNIT ALLOCATION | UNIT ALLOCATION |
| 2 | atan (1/2) 26.57 | 6.00 | 5.367 | 4 | 12 |
| 3 | atan (1/3) 18.43 | 9.00 | 8.538 | 9 | 27 |
| 4 | atan (1/4) 14.04 | 12.00 | 11.642 | 16 | 48 |
| 5 | atan (1/5) 11.31 | 15.00 | 14.709 | 25 | 75 |
| 6 | atan (1/6) 9.46 | 18.00 | 17.755 | 36 | 108 |
| n | atan (1/n) | $3n$ | $3n\cos(\mathrm{atan}(1/n))$ | $n^2$ | $3n^2$ |

F I G. 6B

FIG. 10A
FIG. 10C
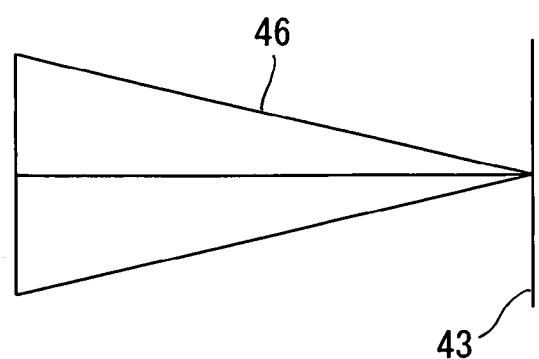
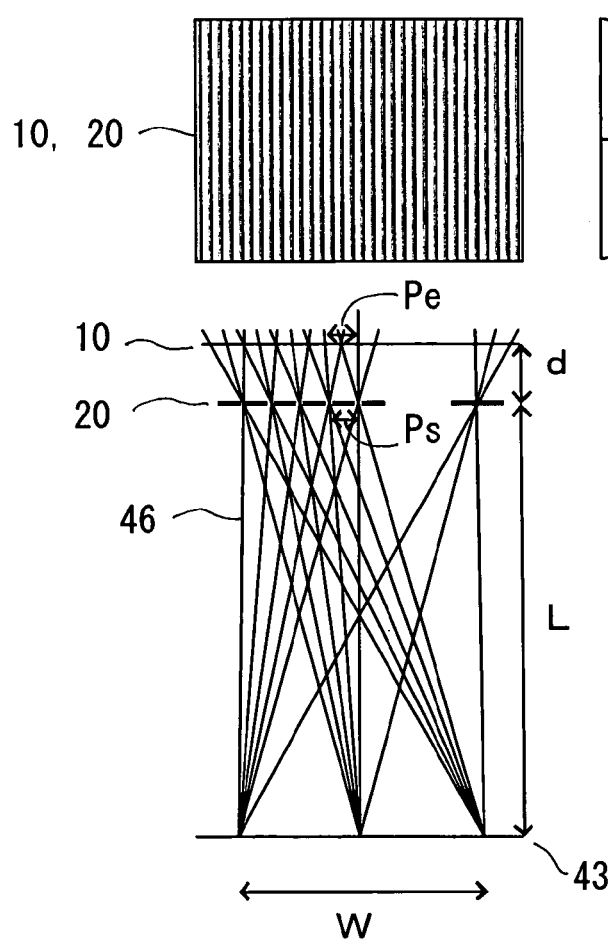
FIG. 10B

421 - Object
422 - Projection Plane
423 - Projection Center Line
424 - Viewing Distance Plane
425 - Projection Lines

FIG. 14

| PARALLAX NUMBER | STEREOSCOPIC DISPLAY PIXEL COLUMN NUMBER | |
|---|---|---|
| | START(LEFT END) | END(RIGHT END) |
| −20 | 2 | 8 |
| −19 | 2 | 30 |
| −18 | 2 | 52 |
| −17 | 2 | 75 |
| −16 | 2 | 97 |
| −15 | 2 | 119 |
| −14 | 2 | 141 |
| −13 | 2 | 163 |
| −12 | 2 | 185 |
| −11 | 2 | 207 |
| −10 | 2 | 229 |
| −9 | 2 | 251 |
| −8 | 1 | 274 |
| −7 | 1 | 296 |
| −6 | 1 | 318 |
| −5 | 1 | 340 |
| −4 | 1 | 362 |
| −3 | 8 | 384 |
| −2 | 30 | 406 |
| −1 | 52 | 428 |
| 0 | 75 | 450 |
| 1 | 97 | 473 |
| 2 | 119 | 495 |
| 3 | 141 | 517 |
| 4 | 163 | 524 |
| 5 | 185 | 524 |
| 6 | 207 | 524 |
| 7 | 229 | 524 |
| 8 | 251 | 524 |
| 9 | 274 | 523 |
| 10 | 296 | 523 |
| 11 | 318 | 523 |
| 12 | 340 | 523 |
| 13 | 362 | 523 |
| 14 | 384 | 523 |
| 15 | 406 | 523 |
| 16 | 428 | 523 |
| 17 | 450 | 523 |
| 18 | 473 | 523 |
| 19 | 495 | 523 |
| 20 | 517 | 523 |

STEREOSCOPIC IMAGE DISPLAY APPARATUS HAVING STEREOSCOPIC PIXEL WITH APPROXIMATELY SQUARE SHAPE AND STEREOSCOPIC IMAGE DISPLAY METHOD

CROSS-REFERENCE TO RELATED APPLICATION

This application is based upon and claims the benefit of priority from prior Japanese Patent Application No. 2005-86481 filed on Mar. 24, 2005 in Japan, the entire contents of which are incorporated herein by reference.

BACKGROUND OF THE INVENTION

1. Field of the Invention

The present invention relates to a stereoscopic image display apparatus and a stereoscopic image display method.

2. Related Art

As a stereoscopic image or motion picture display apparatus which allows display of a motion picture, a so-called "a three-dimensional display", various ones employing different systems have been known. In recent years, particularly, a demand for a display device of a flat panel type employing a system where it is not required to use dedicated eyeglasses or the like is increasing. As a stereoscopic motion picture display apparatus of such a type, there is known one utilizing a principle of holography, which is difficult to be put in a practical use. A system where an optical plate or a beam controlling element is installed just in front of a display panel (a flat display device) whose pixel positions are fixed, such as a liquid crystal display apparatus of a direct view type or a projection type, or a plasma display apparatus is known as a system which can be realized relatively easily. In this connection, the optical plate serves to control beams from the display panel to direct them to an observer or viewer.

The optical plate is generally called "a parallax barrier", and it controls beams such that different images are viewed according to an angle change even at one or the same position on the beam control element. Specifically, when only lateral parallax (horizontal disparity) is applied, a slit array plate or a lenticular sheet (a cylindrical lens array) is used, and when an vertical parallax (a vertical disparity) is also included, a pinhole array or a lens array is used. The systems using the parallax barrier are also classified to a binocular system, a multiview system, a super-multiview system (super-multiview conditions in the multiview system), or an integral photography (hereinafter, also called "IP"). A basic principle common to these systems is substantially the same as that used in a stereoscopic photograph invented about a hundred years ago.

As described in SID04 Digest 1438 (2004), for example, the IP system of these systems has such a feature that the degree of freedom is high regarding a viewing point position and a stereoscopic view can be achieved easily. In the IP system which includes only horizontal disparity but does not include vertical disparity, a display apparatus with a high resolution can be relatively easily realized. On the other hand, in the binocular system or the multiview system, there is such a problem that it is difficult to see an image in a stereoscopic manner due to narrowness of a range of a view point position which allows a stereoscopic view, i.e., a viewing zone, but the simplest constitution can be adopted as a constitution for a stereoscopic image display apparatus and a display image can also be produced easily.

In a direct view type autostereoscopic image display apparatus using such a slit array plate or a lenticular sheet, moire or color moire occurs easily due to interference between a periodical structure about an aperture of an optical plate and a periodical structure about a pixel on a flat display apparatus. As a method for solving such a problem, a method where a direction in which the apertures extend is inclined obliquely has been known (for example, see JP-A-2001-501073).

However, when the apertures of the optical plate are provided obliquely, pixels at a stereoscopic image display (a stereoscopic display pixels) do not constitute a square arrangement but a parallelogram arrangement, so that when a stereoscopic image is composed by utilizing photographed images of multi cameras (multiview point images), it is necessary to perform arrangement conversion of the pixels. Such a problem arises that arrangement conversion based upon a simple processing caused degradation of image quality, arrangement conversion utilizing an interpolation or the like causes reduction in processing speed, and arrangement conversion based upon thinning of redundant data increases data amount. There is also such a problem that display characteristics bring discomfort to human vision characteristics due to that a higher direction of resolution becomes asymmetrical in a vertical direction and in a horizontal direction, motion parallax causes up and down movement, and so on.

As described above, in the conventional stereoscopic image display apparatus including the optical plate arranged obliquely, there is a problem about increase in image processing amount or display characteristics due to that such a fact that the pixel arrangement at the stereoscopic display is not the square arrangement.

SUMMARY OF THE INVENTION

The present invention has been made in view of the above circumstances, and an object thereof is to provide a stereoscopic image display apparatus and a stereoscopic image display method which can prevent an image processing amount from increasing and can obtain excellent display characteristics.

A stereoscopic image display apparatus according to a first aspect of the present invention includes: a flat display device having approximately square pixels arranged on a flat display plane in a square manner: and an optical plate which is disposed in front of the display device and has optical apertures which extend linearly in the same direction as a diagonal line of a rectangle obtained by connecting n pieces of the pixels vertically, for controlling directions of light rays from the pixels, the flat display plane of the flat display device being divided to elemental images, each corresponding to each of the optical apertures in the optical plate, and an average value of pitches of the elemental images being larger than m (m=1, 2,3 . . . ) times a length of a diagonal line of a rectangle obtained by connecting n pieces of the pixels laterally and the pitch of the optical apertures in the optical plate being equal to m times the length of the diagonal line of the rectangle obtained by connecting n pieces of the pixels laterally.

A stereoscopic image display apparatus according to a second aspect of the present invention includes: a flat display device having approximately square pixels arranged on a flat display plane in a square manner: and an optical plate which is disposed in front of the display device and has optical apertures which extend linearly in the same direction as a diagonal line of a rectangle obtained by connecting n pieces of the pixels vertically, for controlling directions of light rays from the pixels, the flat display plane of the flat display device being divided to elemental images, each corresponding to each of the optical apertures in the optical plate, and an average value of pitches of the elemental images being equal to m (m=1,2,3 . . . ) times a length of a diagonal line of a rectangle obtained by connecting n pieces of the pixels laterally and the pitch of the optical apertures in the optical plate being smaller that m times the length of the diagonal line of the rectangle obtained by connecting n pieces of the pixels laterally.

Vertical and lateral arrangement directions of the pixels arranged in the square manner on the flat display device can be set in an oblique direction to a rectangular frame of the display portion on the whole stereoscopic image display apparatus, and the optical apertures in the optical plate can be arranged in parallel with left and right ends of the display portion on the whole stereoscopic image display apparatus.

Vertical and lateral arrangement directions of the pixels arranged in the square manner on the flat display device can be set in a vertical and parallel direction to a rectangular frame of the display portion on the whole stereoscopic image display apparatus, and the optical apertures in the optical plate can be arranged in an oblique direction to left and right ends of the display portion of the whole stereoscopic image display apparatus.

A shape of a whole display region on the flat display device can be substantially coincident with a shape of the rectangular frame of the display portion on the whole stereoscopic image display apparatus.

Each of the pixels on the flat display device can be divided to three sub-pixels with an approximately rectangular shape by two boundary lines extending in a direction close to a direction in which the optical apertures in the optical plate extend.

A stereoscopic image display method according to a third aspect of the present invention: the method which displays a stereoscopic image using a stereoscopic image display apparatus provided with a flat display device having approximately square pixels arranged on a flat display plane in a square manner, and an optical plate which is disposed in front of the display device and has optical apertures which extend linearly in the same direction as a diagonal line of a rectangle obtained by connecting n pieces of the pixels vertically, for controlling directions of light rays from the pixels, where the flat display plane of the flat display device are divided to elemental images corresponding to each of the optical apertures in the optical plate, the method including: arranging image information and parallax information such that pixels with a square shape having a length of one side of $(1+n^2)^{1/2} \times$(a pixel pitch on the flat display device)$\times$m are put in a square arrangement.

BRIEF DESCRIPTION OF THE DRAWINGS

FIGS. 1A to 1D are diagrams showing shapes of a stereoscopic display pixel constituted of a pixel group on a flat display portion which are used in a stereoscopic image display apparatus of a multiview system according to a first embodiment of the present invention;

FIG. 1E is a diagram showing a position relationship between the stereoscopic display pixels shown in FIG. 1A and an optical plate;

FIG. 1F is a diagram showing a pixel on the flat display portion;

FIG. 6A is a table collectively showing characteristic values of the stereoscopic image display apparatus according to the present invention, and FIG. 6B is a table collectively showing characteristic values of the stereoscopic image display apparatus according to the comparative example;

FIGS. 10A to 10C are illustrations showing a relationship among an elemental image pitch Pe, an optical aperture pitch Ps of the optical plate, a gap d between the optical plate and an pixel screen, a viewing distance L, and a viewing zone width W in the stereoscopic image display apparatus according to the first and second embodiments;

FIG. 14 is a table showing one example of parallax image allocation in the stereoscopic image display apparatus according to the second embodiment;

DETAILED DESCRIPTION OF THE INVENTION

Stereoscopic image display apparatuses according to embodiments of the present invention will be explained below in detail with reference to the drawings.

Figure 9:
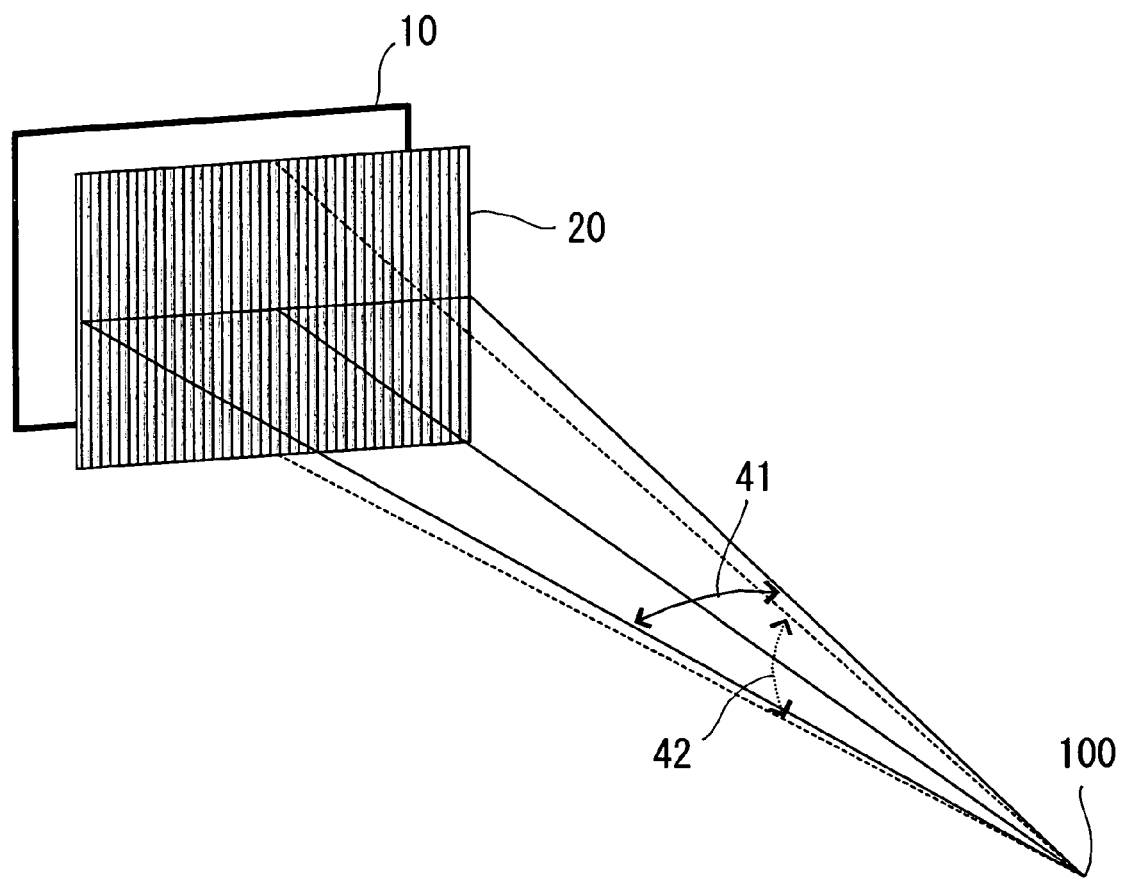
FIG. 9 is a perspective view schematically showing a stereoscopic image display apparatus.

Each of stereoscopic image display apparatuses according to the following embodiments may be of a multiview system or of an IP system, and it is provided with a flat display device 10 having a flat display portion where pixels are arranged in a matrix manner and an optical plate 20 which is provided in front of the flat display device 10 to include an optical aperture and control beams from pixels on the flat display portion, as shown in FIG. 9. A viewer or observer can see a stereoscopic image within ranges of a horizontal view angle 41 and a vertical view angle 42 by viewing or observing light beams emitted from the flat display device 10 via the optical plate 20 from a position 100 of eyes of the viewer. The term "optical aperture" means physical openings when the beam control element is constituted of slits and respective cylindrical lenses when the beam control element is a lenticular sheet. A spacer may be provided between the flat display device 10 and the optical plate 20 in order to adjust a focal length.

First Embodiment

A stereoscopic image display apparatus according to a first embodiment of the present invention is of the multiview system and it is constituted such that a direction in which the optical aperture of the optical plate 20 extends is inclined obliquely relative to a vertical direction on a display plane of the flat display portion or device 10. Shapes of a stereoscopic display pixel 12 constituted of a pixel group within the display plane of the flat display portion 10 are shown in FIGS. 1A, 1B, 1C, and 1D. FIGS. 1A, 1B, 1C, and 1D show respective cases of n=3, 4, 5, and 6 when a length of one side of an approximately square shape corresponding to the stereoscopic display pixel 12 coincides with a length of a diagonal line of a rectangle constituted of n pixels 14 shown in FIG. 1F arranged in a lateral direction of the flat display portion 10. Each region of almost squares surrounded by a solid line is a region corresponding to the stereoscopic display pixel 12. Broken lines are depicted such that they coincide with a diagonal line of a rectangle constituted of n pixels 14 arranged in a lateral direction of the flat display portion 10 and a diagonal line of a rectangle constituted of n pixels 14 arranged in a vertical direction of the flat image display portion 10. Lateral and vertical broken lines are arranged obliquely but they form a square arrangement of an almost square. FIG. 1E is a diagram showing a position relationship including the optical plate 20 written in FIG. 1A in an additional manner. A slit array plate or a lenticular sheet constituting the optical plate 20 is provided such that a direction in which its optical apertures extend is the same direction as the vertical broken line and the optical aperture is positioned at an almost intermediate position between adjacent vertical broken lines.

Since the present embodiment is of the multiview system, as shown in FIGS. 1A, 1B, 1C, and 1D, constitution is achieved such that the display plane of the flat display portion 10 is filled with the stereoscopic display pixels 12 with the same shape. Accordingly, the flat display portion 10 is divided to elemental images corresponding to the respective optical apertures, and the elemental image is constituted of a plurality of stereoscopic display pixels 12 with the same almost square shape which are arranged in a direction in which the optical apertures in the optical plate 20 extend. Therefore, when a viewer sees a stereoscopic image through the optical apertures in the optical plate 20, the stereoscopic display pixel 12 forms a square pixel and the stereoscopic image appears as a square arrangement of the stereoscopic display pixels 12.

Each pixel 14 on the flat display portion 10 is formed in a square constituted of three sub-pixels of red (R), green (G), and blue (B) arranged laterally, and sub-pixels with the same color are arranged in the same column (an ordinary stripe arrangement). A boundary of the stereoscopic display pixel 12 displayed with a solid line is sectioned for each sub-pixel. Numerals in FIGS. 1A, 1B, 1C, and 1D denote examples of parallax information numbers to be allocated. Parallax information elements are sequentially allocated, one by one, to three sub-pixels of RGB arranged in a vertical direction (in the same direction as the direction in which the optical apertures in the optical plate 20 extend) within the stereoscopic display pixel 12. Adjacent parallax information elements are arranged in a lateral direction (in the same direction as a cyclic direction of the optical apertures in the optical plate 20) in an averaging manner. For example, parallax information corresponding to a parallax number of "1" is allocated to three sub-pixels of RGB, positioned at the leftmost on the stereoscopic display pixel 12 and arranged in a vertical direction, and parallax information corresponding to a parallax number of "2" which is the next parallax number is allocated to three sub-pixels of RGB arranged in a vertical direction following these three sub-pixels. Incidentally, when the sub-pixels of RGB arranged in a vertical direction following the previously allocated sub-pixels reach a lower end of the stereoscopic display pixel 12, parallax information is allocated to the uppermost sub-pixel of sub-pixels which are positioned adjacent to the previously allocated sub-pixels and are arranged in a vertical direction. As a result, when only the same or one sub-pixel column is viewed, parallax numbers appear as a sequential number. Incidentally, such a constitution may be adopted that the number of parallaxes is increased instead of dropping color information and one parallax information element is allocated to one sub-pixel. Such a way may be employed that parallaxes are allocated for each pixel instead of each sub-pixel and the boundary for the stereoscopic display time pixel is caused to coincide with a pixel boundary.

In the embodiment, as understood from FIGS. 1A to 1F, a length of diagonal line of a rectangle constituted of n pixels arranged laterally of the flat display portion 10 is equal to a length of one side of the stereoscopic pixel 12 with a generally square shape, namely, an average pitch of the elemental images, and it is equal to $(1+n^2)^{1/2}$ times one side of the pixel 14 on the flat display portion 10. Since this embodiment is of the multiview system, the pitch of the optical aperture on the optical plate 20 is constituted so as to be smaller than the length of a diagonal line of the rectangle constituted of n pixels arranged on the flat display portion 10 in a lateral direction. Specifically, the pitch of the optical aperture on the optical plate is designed such that beams from sub-pixels with the same parallax number emitted from the respective optical apertures in the optical plate are focused on an expected position on an eye of a viewer.

Alternatively, a stereoscopic pixel which combines m×m above-described stereoscopic pixels with a generally square shape can be used, m times length of a diagonal line of the rectangle constituted of n pixels arranged on the flat display portion 10 in a lateral direction can be equal to a length of one side of the stereoscopic pixel 12 with the generally square shape, namely, an average pitch of the elemental images, and it is equal to $m \times (1+n^2)^{1/2}$ times one side of the pixel 14 on the flat display portion 10. In this case, a pitch of the optical aperture on the optical plate 20 is constituted so as to be smaller than m times length of a diagonal line of the rectangle constituted of n pixels arranged on the flat display portion 10 in a lateral direction. When m becomes larger, a resolution decreases, meanwhile number of parallaxes increase thereby enlarging a range of near-side and far-side.

Comparative Example

Figure 2A:
FIGS. 2A to 2E are diagrams showing shapes and arrangements of stereoscopic display pixels of a comparative example to the first embodiment.
Figure 2B:
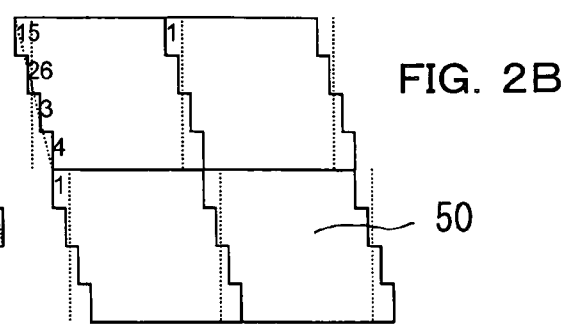
Figure 2C:
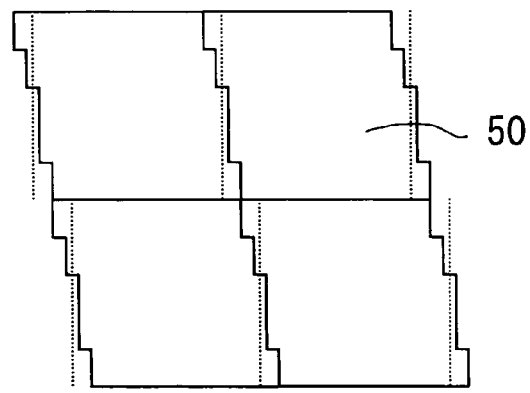
Figure 2D:
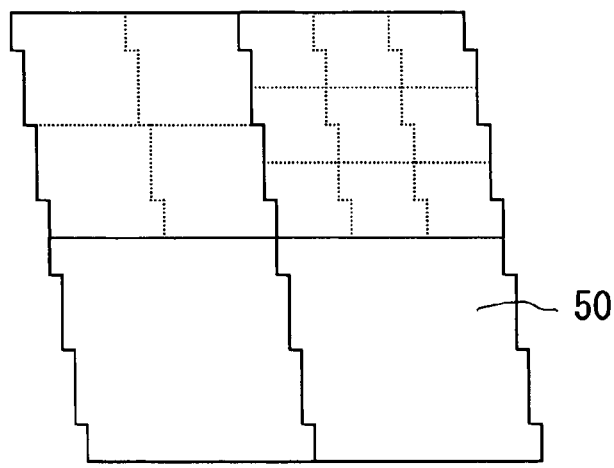
Figure 2E:
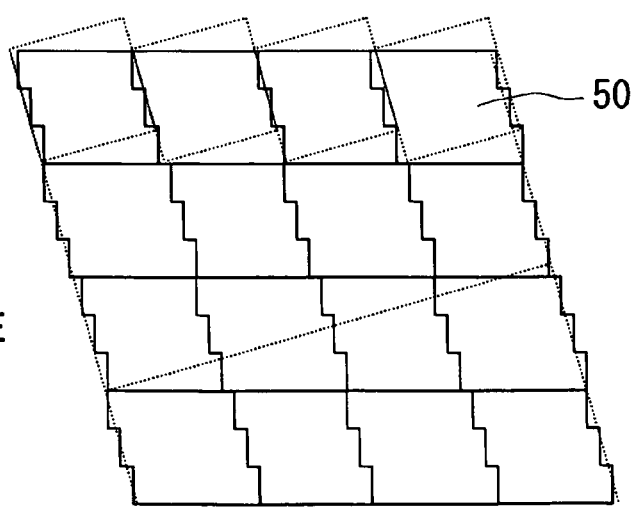

Next, for comparison with this embodiment, arrangement examples of stereoscopic display pixels used in a conventional stereoscopic image display apparatus where an optical plate is disposed obliquely are shown in FIGS. 2A, 2B, 2C, 2D, and 2E. FIG. 2A shows a conventional example where one pixel row corresponds to 3.5 parallaxes for each one sub-pixel (two pixel rows correspond to 7 parallaxes for each one sub-pixel), FIG. 2B shows a conventional example where 4 pixel rows correspond to 16 parallaxes for each 3 sub-pixels, FIG. 2C shows a conventional example where 5 pixel rows correspond to 25 parallaxes for each 3 sub-pixels, FIG. 2D shows a conventional example where 6 pixel rows correspond to 36 parallaxes for each 3 sub-pixels (and divided one), and FIG. 2E shows a conventional example where 3 pixel rows correspond to 9 parallaxes for each 3 sub-pixels.

In these comparative examples, each shape of stereoscopic display pixels 50 are all formed in a parallelogram and arrangements of the pixels are not a square arrangement but parallelogram arrangement. In the comparative examples, therefore, it is necessary to produce each parallax image so as to match with a resolution and an arrangement of the stereoscopic display pixel 50. However, since an mage obtained by an ordinary image photographing or CG rendering has a square arrangement, when the stereoscopic display pixel 50 has an arrangement different from a square arrangement as shown in FIG. 2A, 2B, 2C, 2D, or 2E, conversion (including interpolation) must be performed.

As explained above, according to this embodiment, since the stereoscopic display pixel can be formed in an almost square pixel and the pixels can take an almost square arrangement, excellent display characteristics can be obtained owing to resolution of uncomfortable feeling, and an amount of image processing can be prevented from increasing.

Second Embodiment

Figure 3A:
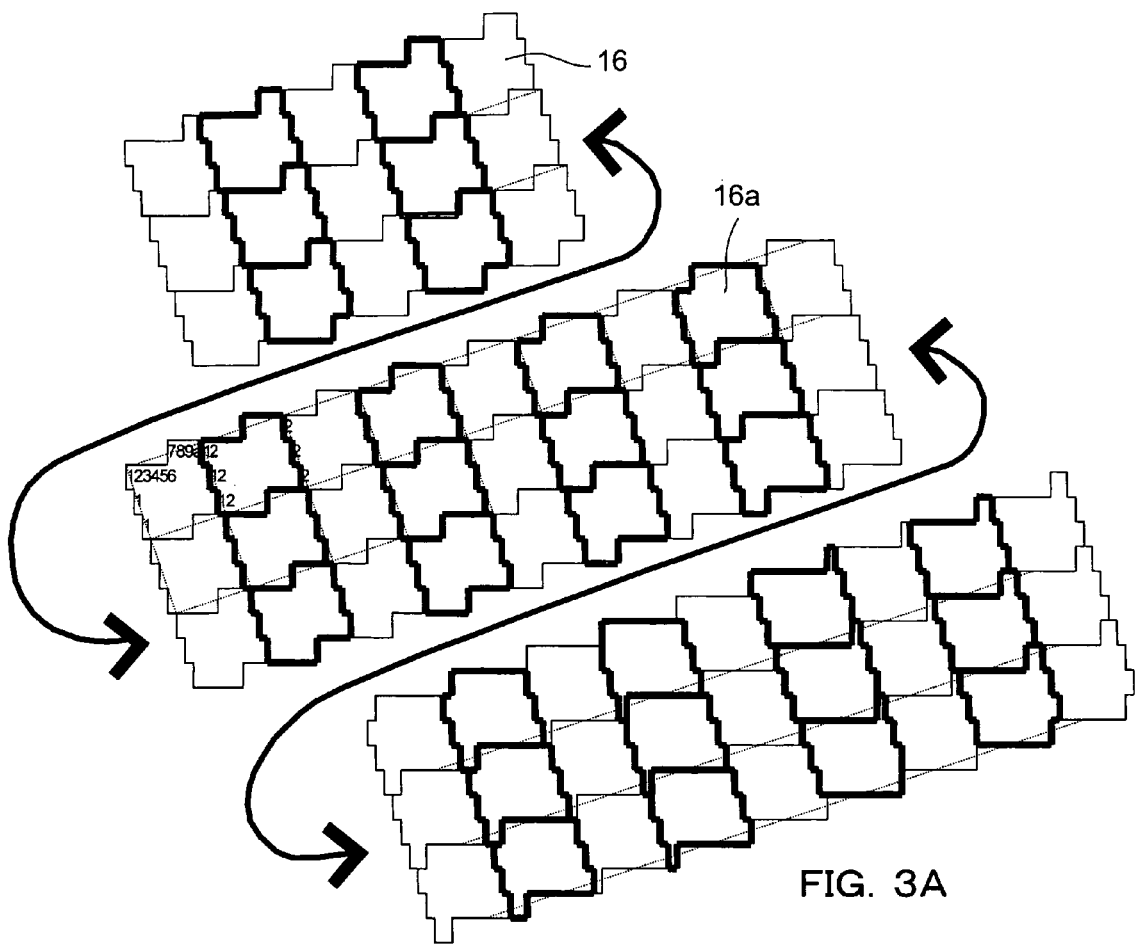
FIGS. 3A and 3B are diagrams showing shapes of a stereoscopic display pixel constituted of a pixel group on a flat display portion which are used in a stereoscopic image display apparatus of a 1-dimensional IP system according to a second embodiment of the present invention.
Figure 3B:
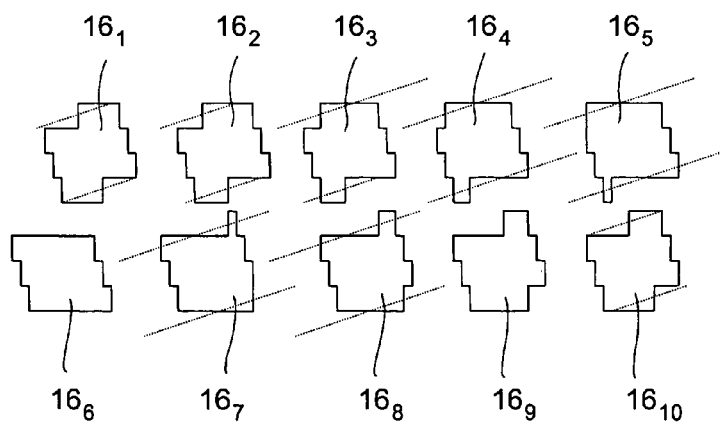

Next, a stereoscopic image display apparatus according to a second embodiment of the present invention will be explained with reference to FIGS. 3A to 7B. The stereoscopic image display apparatus according to the second embodiment is of a one-dimensional IP system of parallel light rays, and it has a constitution that a direction in which optical apertures in an optical plate 20 extend is inclined obliquely relative to a vertical direction in a display plane on a flat display device 10. Further, a pitch of the optical apertures in the optical controlling element 20 becomes equal to a diagonal line of a rectangle constituted of n pixels of the flat display device 10 arranged in a lateral direction, where the same sets of parallel light rays as the number of parallaxes are reproduced in different directions. The number of parallel light rays in each set is equal to number to optical apertures. Shapes of a stereoscopic display pixel 16 constituted of a pixel group within a display plane on the flat display portion 10 are shown in FIGS. 3A and 3B. One parallax information element is given for each three sub-pixels. FIG. 3A shows an example of change in shape of a stereoscopic display time pixel in case of n=3, where pixels with the same shape line in a vertical direction but shapes of pixels change in a horizontal or lateral direction. Pixels lining in the lateral direction have been illustrated in an omitted manner. In fact, thin line stereoscopic display pixels with the same shape continuously line over several or several tens and thick line stereoscopic display pixels are inserted in only one column constituting a boundary for shape change. The thick line stereoscopic display pixel has an area larger than an area of the thin line stereoscopic display pixel by an area corresponding to an area of three sub-pixels. This is because an average elemental image pitch is larger than a length of a diagonal line of a rectangle obtained by arranging n pixels due to employment of constitution where parallel light ray groups are reproduced and when an elemental image boundary is caused to coincide with the nearest sub-pixel boundary, misalignment of a boundary further increases according to a lateral position on a screen. FIG. 3B shows stereoscopic display pixels $16_1$ to $16_{10}$ which are shapes (10 kinds) which a stereoscopic display pixel with a base shape (the thin line stereoscopic display pixel in FIG. 3A) can take. The respective pixels have such a shape change that three sub-pixels corresponding to one parallax information element have been moved from a left end to a right end. Incidentally, broken lines in FIGS. 3A and 3B are depicted such that they coincide with a direction of a diagonal line of a rectangle constituted of n pixels arranged in a lateral direction on the flat display portion 10 and a direction of a diagonal line of a rectangle constituted of n pixels arranged in a vertical direction on the flat display portion 10. The diagonal line of the rectangle constituted of n pixels arranged in a vertical direction on the flat display portion 10 is coincident with a direction in which the optical apertures in the optical plate 20 extend.

Figure 4A:
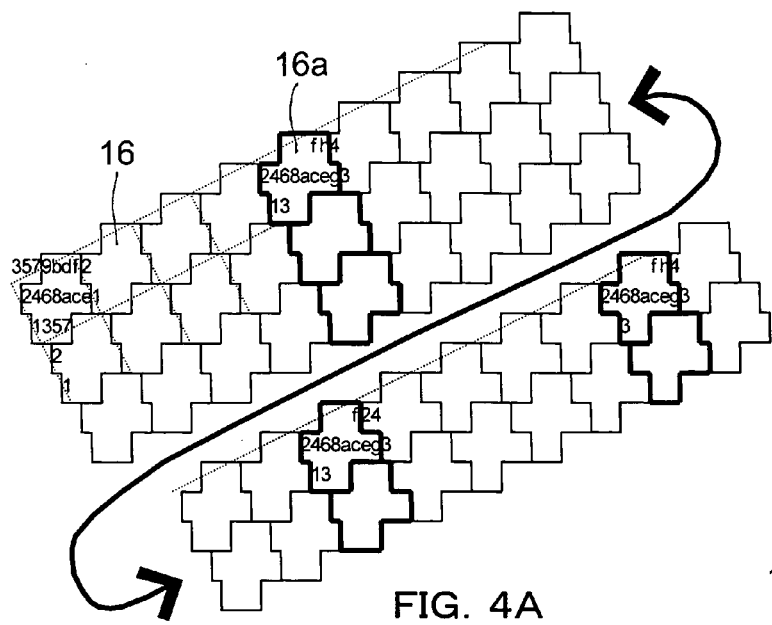
FIGS. 4A and 4B are diagram showing shapes of a stereoscopic display pixel constituted of a pixel group on a flat display portion which are used the stereoscopic image display apparatus according to the second embodiment.
Figure 4B:
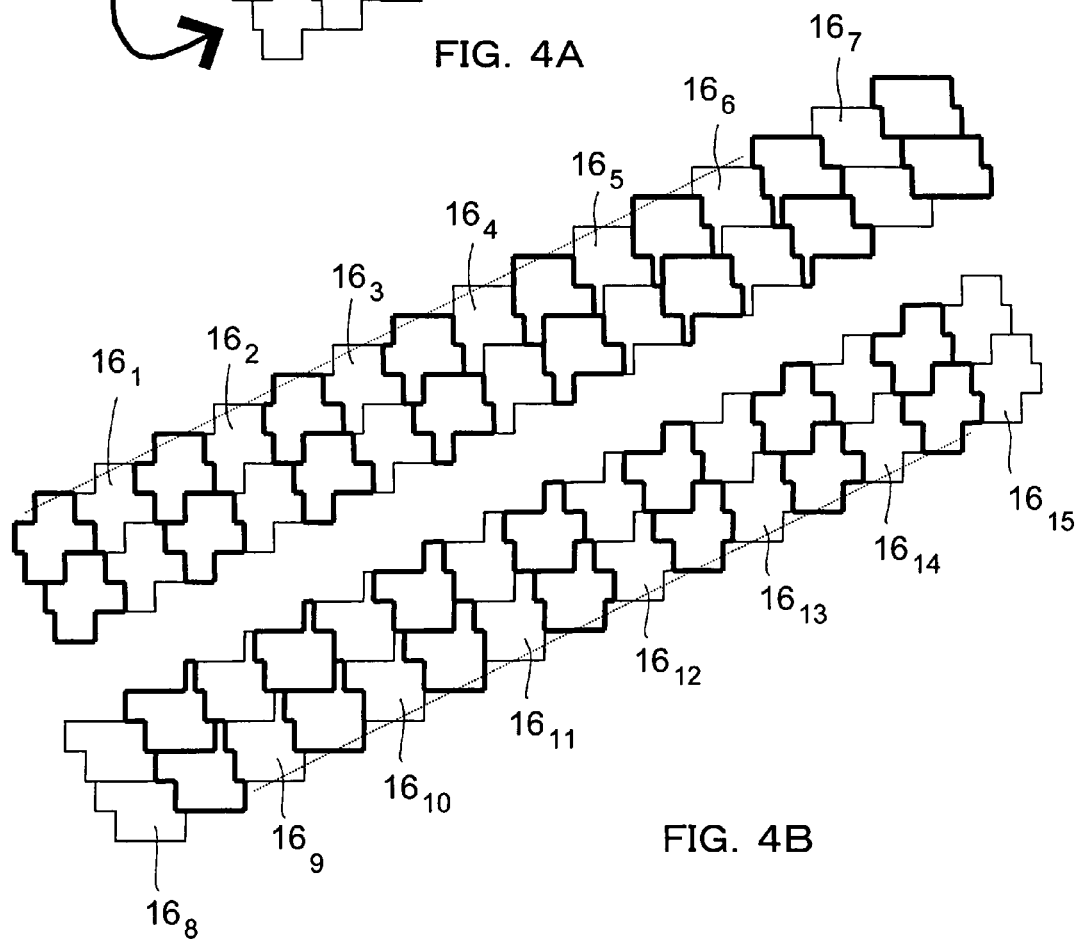

An example of shapes of a stereoscopic display pixel 16 constituted of a pixel group on the flat display portion 10 which is used in the one-dimensional IP system according to the embodiment in case of n=2 is shown in FIGS. 4A and 4B. In this example, one parallax information element is given for each one sub-pixel. FIG. 4A shows a case that pixels with the same shape line in a vertical direction but shapes of pixels change in a lateral direction like the case shown in FIG. 3A. Pixels lining in the lateral direction have been illustrated in an omitted manner. In fact, thin line stereoscopic display pixels with the same shape continuously line over several or several tens and thick line stereoscopic display pixels are inserted in only one column constituting a boundary for shape change. The thick line stereoscopic display pixel has an area larger than an area of the thin line stereoscopic display time pixel by an area corresponding to an area of one sub-pixel. FIG. 4B shows stereoscopic display pixels $16_1$ to $16_{15}$ which are shapes (15 kinds) which a stereoscopic display time pixel with a base shape can take. The respective pixels have such a shape change that one sub-pixel corresponding to one parallax information element has been moved from a left end to a right end. Numbers written in the stereoscopic display pixels represent parallax information numbers.

Unlike the present embodiment, in the multiview system, an average value of elemental image pitches is equal to a length of a diagonal line of a rectangle constituted of n pixels arranged in a lateral direction on a display plane of the flat display portion 10 and a lateral pitch of optical apertures in the optical plate 20 is shorter than the length of the diagonal line of rectangle constituted of n pixels arranged in a lateral direction on a display plane of the flat display portion 10. Therefore, the stereoscopic display pixels 12 with the shapes shown in FIGS. 1A, 1B, 1C, and 1D are obtained over a whole display plane on the flat display portion 10.

On the other hand, in the parallel light ray one-dimensional IP system according to the embodiment, an average value of elemental image pitches is longer than a length of a diagonal line constituted of n pixels arranged in a lateral direction on the flat display portion and a lateral pitch of the optical apertures in the optical plate is equal to a length of a diagonal of a rectangle constituted of n pixels arranged in a lateral direction on the flat display portion. As shown in FIGS. 3A and 3B, therefore, the shapes of the stereoscopic display pixels 16 arranged in a horizontal direction on the flat display portion 10 change according to arrangement positions thereof, but a series of stereoscopic display pixels arranged vertically and constituting one elemental image have the same or one shape.

Shapes which the stereoscopic display pixel 16 can take in case of n=3 are shown in FIG. 3B. In FIG. 3B, the stereoscopic display pixels $16_i$ (i=2, ..., 10) is constituted such that three sub-pixels on the flat display portion arranged in a direction (a direction indicated by a broken line in a vertical direction) in which optical apertures in the optical plate 20 extend and positioned at the leftmost position on the stereoscopic display pixel $16_{i-1}$ are arranged adjacent to a sub-pixel on the flat display portion arranged in a direction in which the optical apertures in the optical plate 20 extend and positioned at the rightmost position on the stereoscopic display time pixel $16_{i-1}$. Incidentally, the stereoscopic display pixel $16_1$ is constituted such that three sub-pixels on the flat display portion arranged in a direction in which the optical apertures in the optical plate 20 extend and positioned on the leftmost position on the stereoscopic display time pixel $16_{10}$ are arranged so as to be adjacent to a sub-pixel on the flat display portion arranged in a direction in which the optical apertures in the optical plate 20 extend and positioned on the rightmost position on the stereoscopic display time pixel $16_{10}$.

These possible stereoscopic display pixels are each formed in an almost square pixel and they can take an almost square arrangement. In the second embodiment, therefore, the stereoscopic display pixels can be each formed in an almost square pixel and they can take an almost square arrangement, so that excellent display characteristics can be obtained owing to resolution of uncomfortable feeling, and an amount of image processing can be prevented from increasing like the first embodiment.

Incidentally, the stereoscopic display pixel $16_1$ used in the one-dimensional IP system according to the second embodiment and shown in FIG. 3B is the same as the stereoscopic display pixel 12 shown in FIG. 1A and it can be used in the multiview system. Since 10 kinds of the stereoscopic display pixels shown in FIG. 3B are each a stereoscopic display pixel with the same shape and they have shapes which can fill the display plane of the flat display portion without any gap, they can be used as stereoscopic display pixels in the multiview system, but it is optimal to use the stereoscopic display pixel 16, most analogous to a square.

Figure 5:
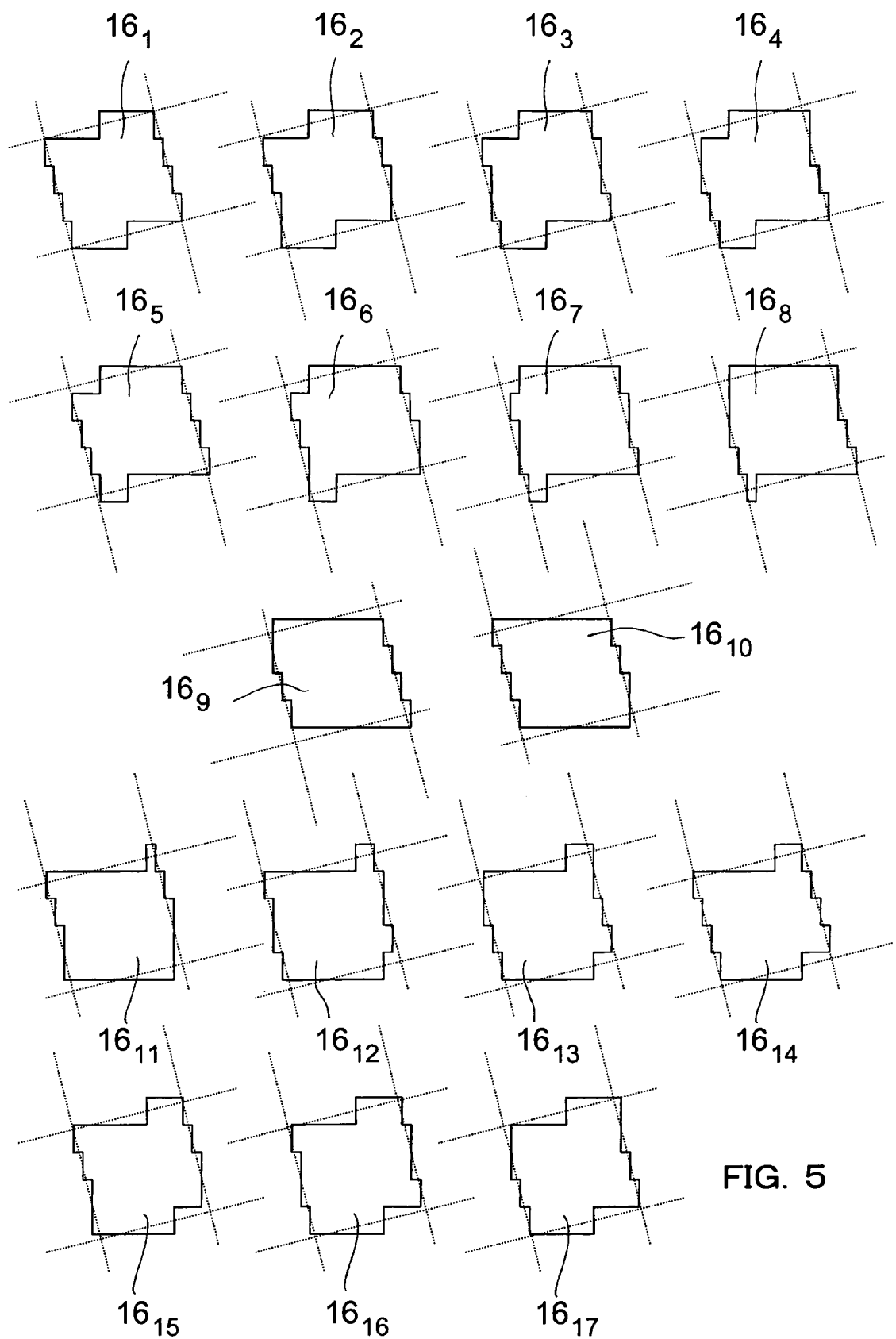
FIG. 5 is a diagram showing other shapes of a stereoscopic display pixel constituted of a pixel group of a flat display portion which is used in the stereoscopic image display apparatus according to the second embodiment.

FIG. 5 shows an example of shapes of a stereoscopic display pixel 16 constituted of a pixel group on the flat display portion 10 which is used in the one-dimensional IP system according to the embodiment in case of n=4. In this example, one parallax information element is given for each three sub-pixels. Stereoscopic display time pixels $16_1$ to $16_{17}$ which are shapes (17 kinds) which a stereoscopic display pixel with a base shape can take are shown in this example. The respective pixels have such a shape change that three sub-pixels corresponding to one parallax information element have been moved from a left end to a right end.

FIGS. 6A and 6B are tables collectively showing constitutions in cases of n=2, 3, 4, 5, and 6, and a general case. FIG. 6A shows a case of multiview system or the one-dimensional IP system according to the present invention, and FIG. 6B shows a case of multiview system or the one-dimensional IP system according to a comparative example. The number of shapes which the stereoscopic display pixel with the basis shape can take in the one-dimensional IP is coincident with the number of parallaxes. In comparison with the comparative example, even if the optical aperture in the optical plate according to the present invention is equal in inclination angle to that according to the comparative example, the former and the latter are different in pitch and number of parallaxes. In FIG. 6, as a stereoscopic pixel a fundamental form (m=1) is shown. When m is not equal to 1, a horizontal pitch, a pitch, and number of parallaxes are equal to m times those of the fundamental form respectively.

Figure 7A:
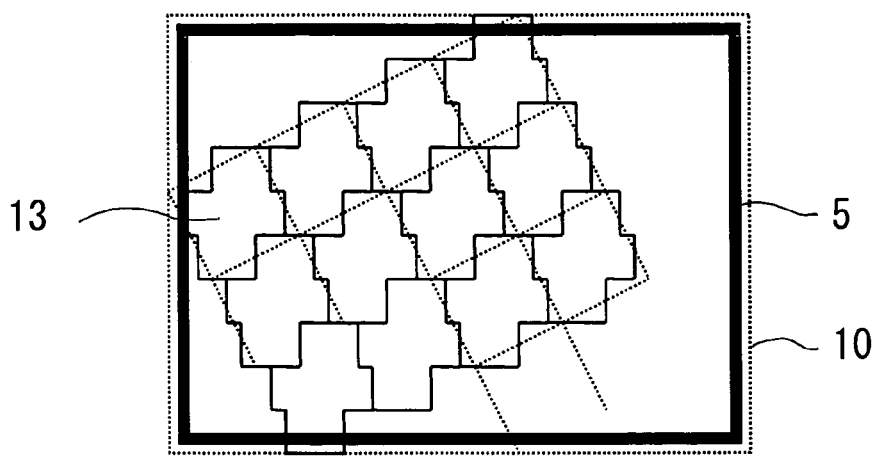
FIGS. 7A to 7C are conceptual diagrams showing position relationships among a vertical arrangement direction of a square arrangement pixels according to the first and second embodiments, a rectangular frame of a display portion of the entire stereoscopic image display apparatus, and a rectangular frame of the flat display portion.
Figure 7B:
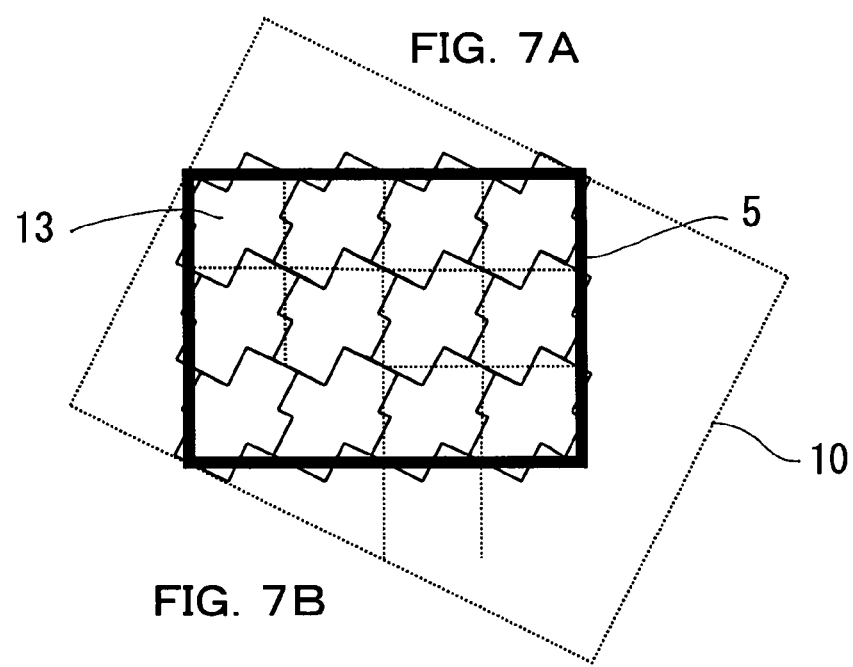
Figure 7C:
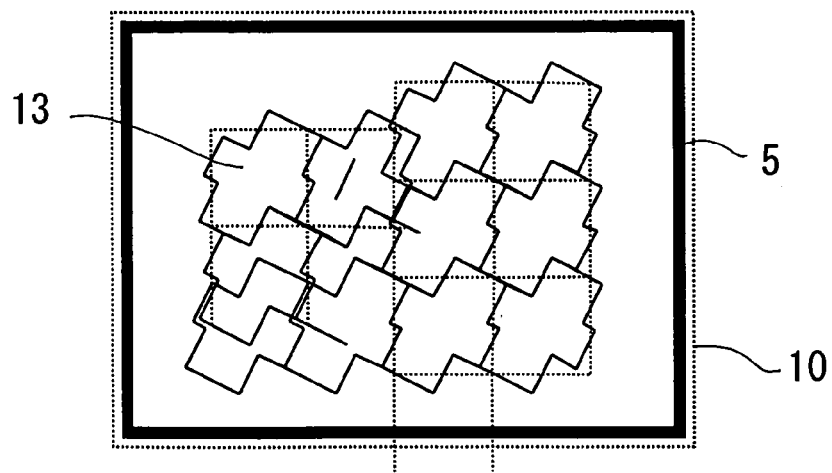

In the first and second embodiments, such a constitution is employed that a direction in which the optical apertures in the optical plate extend is inclined obliquely relative to a vertical direction on the display plane on the flat display portion or device, as shown in FIG. 7A, but arrangements or constitutions shown in FIGS. 7B and 7C may be adopted.

FIGS. 7A, 7B, and 7C are conceptual diagrams showing a positional relationship between a vertically arranging direction of a square arrangement pixels 13 and a rectangle frame 5 of a display portion on the whole stereoscopic image display apparatus (the example of n=2). FIG. 7A shows a case that an optical plate having obliquely inclined optical apertures is arranged to a flat display portion 10 with an ordinary structure. In this case, a vertically arranging direction of square arrangement pixels 13 and optical apertures in the optical plate are set in a direction oblique to the rectangular frame 5 of the display portion on the whole image display apparatus, and they are also oblique to vertical and horizontal directions on a screen which is viewed by a viewer.

FIG. 7B shows an example or a case that a vertically arranging direction of square arrangement pixels 13 and optical apertures in the optical plate are set in a direction oblique to the rectangular frame 5 of the display portion 10 on the whole image display apparatus but they are not oblique to vertical and horizontal directions on the frame or screen 5 which is viewed as the stereoscopic image display apparatus by a viewer. In this case, the stereoscopic display pixels 13 each form a square pixel and they constitute a square arrangement and a symmetrical arrangement regarding a vertical direction and a horizontal direction (are not inclined obliquely), which forms a desirable aspect as display characteristics. Further, as shown in FIG. 7C, when a shape of the whole display region on the flat display portion 10 is substantially coincident with a shape of the rectangular frame 5 of the display portion on the entire stereoscopic display apparatus, all the pixels on the flat display portion can be utilized for displaying, but the flat display portion must be structured such that upper and lower, and left and right ends of the display region are inclined, which is different from a general structure.

Next, a stereoscopic image displaying according to a parallax image arrangement in the IP system will be explained with reference to FIGS. 8A to 17. Display of a stereoscopic image shown in FIGS. 8A to 17 can be realized by combination with the stereoscopic image display apparatus explained with reference to FIGS. 1A to 7C.

Figure 8A:
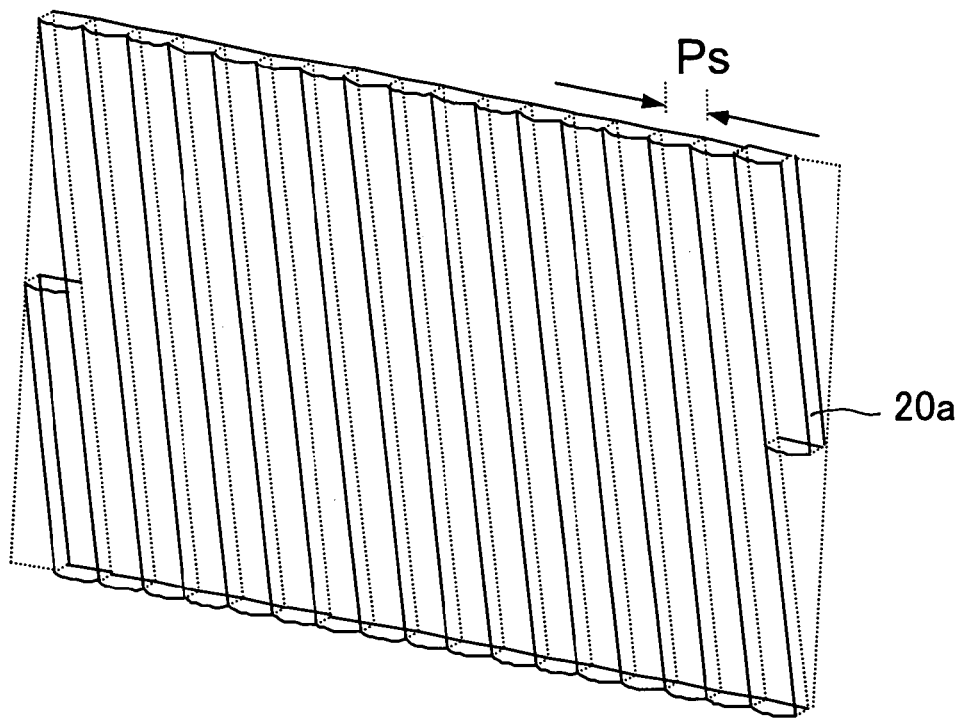
FIGS. 8A and 8B are perspective views schematically showing the optical plates according to the first and second embodiments.
Figure 8B:
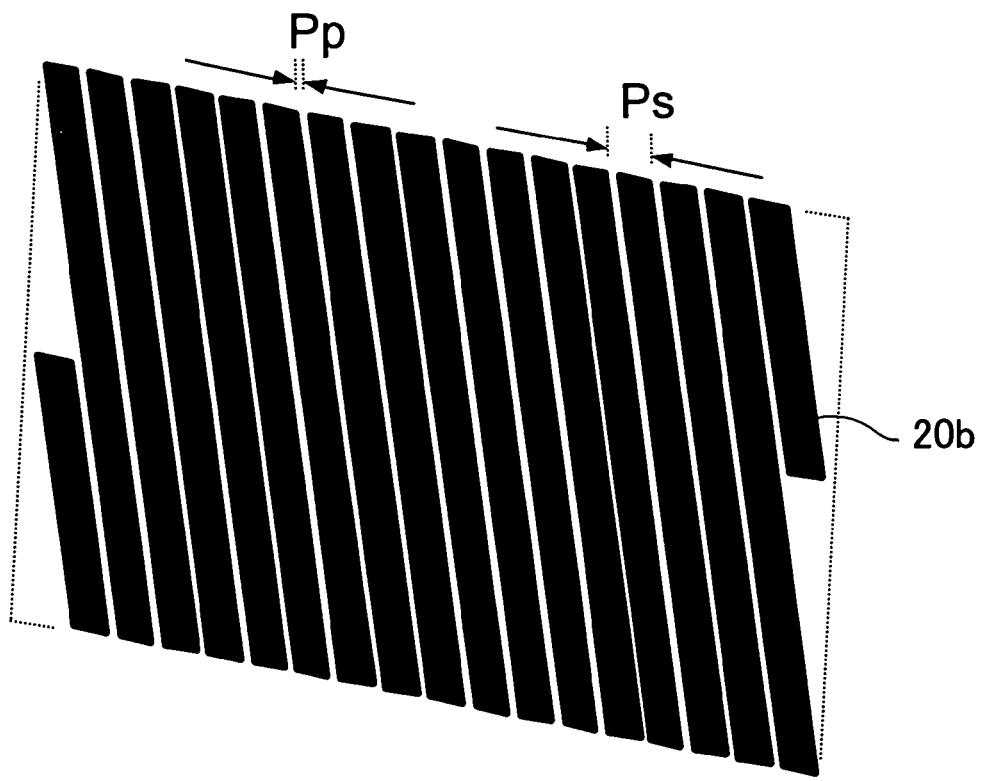

Since a viewing distance is generally finite in both of the IP system and the multiview system, a display image is produced such that a perspective projection image at the viewing distance actually appears. FIG. 8A is a perspective view of a lenticular sheet 20a serving as the optical plate, and FIG. 8B is a perspective view of a slit array plate 20b serving as the optical plate.

FIG. 9 is a perspective view schematically showing the entire of the stereoscopic image display apparatus. FIGS. 10A, 10B, and 10C are developed diagrams schematically showing a position relationship within a vertical plane and a horizontal plane based upon the display portion of the stereoscopic image display apparatus shown in FIG. 9, where FIG. 10A is a front view of the flat display portion, FIG. 10B is a top view of the optical plate, and FIG. 10C is a side view of the stereoscopic image display apparatus.

As shown in FIGS. 9 to 10C, the stereoscopic image display apparatus is provided with a flat display portion 10 such as a liquid crystal display (LCD) device (liquid crystal display panel) and an optical plate 20. The beam control element 20 corresponds to a kind of an optical aperture member, and it is constituted of a lenticular sheet 20a or a slit 20b where optical apertures extending in an oblique direction close to a vertical direction are arranged in a cyclic manner, as shown in FIGS. 8A and 8B. In the stereoscopic image display apparatus, a viewer can observe light rays emitted from the flat display portion 10 via the optical plate 20 from his/her eye position to observe stereoscopic images in a front area and in a rear area of the optical plate 20 within a range of a horizontal viewing angle 41 and a vertical viewing angle 42. Here, the number of pixels on the flat display portion 10 is 1920 in a lateral direction (in a horizontal direction) and 1200 a vertical direction when the pixels are counted based upon the minimum pixel group forming a square. Each minimum pixel group includes pixels of red (R), green (G) and blue (B).

In FIGS. 10A, 10B, and 10C, a viewing distance L between the optical plate 20 and the viewing distance plane 43, a pitch Ps of optical apertures in the optical plate, a gap d between the optical plate and a pixel plane are set, a pitch Pe of elemental images is determined based upon spacings of optical aperture centers projected from a viewing point on the viewing distance plane 43 on the pixel plane. Reference numeral 46 denotes a line connecting the viewing point position and each optical aperture center, and a viewing zone width W is determined under such a condition that elemental images do not overlap with each other on the pixel plane on the flat display portion.

Figure 11:
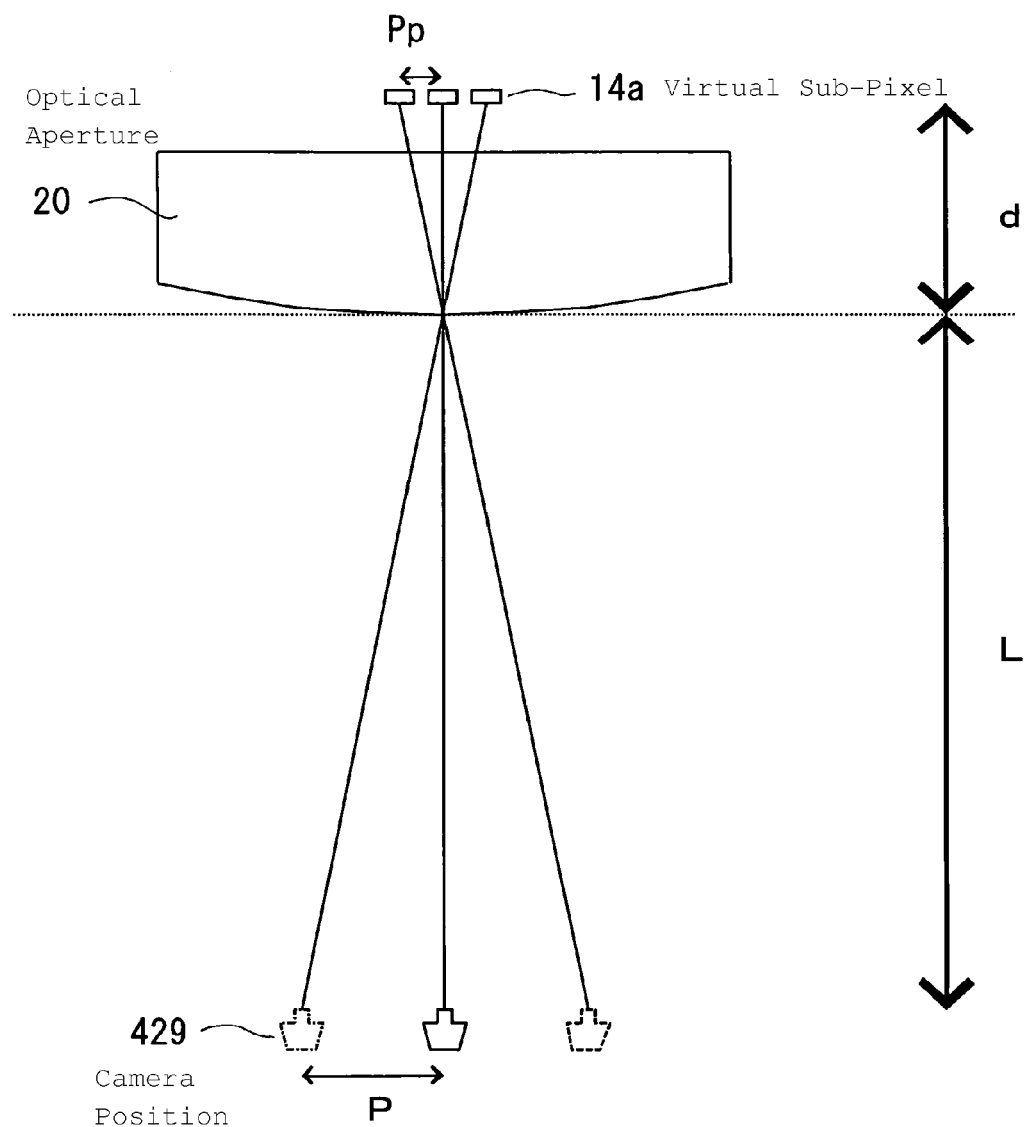
FIG. 11 is a conceptual diagram showing a position relationship between parallax information put on the flat display portion according to the first and second embodiments and a camera used for photographing images or performing CG rendering.

FIG. 11 is a conceptual diagram showing a position relationship between parallax information put on the flat display portion and a projection camera used for imaging or CG rendering. In case of n=4, the number of parallaxes is 17, a camera position 429 is determined based upon a position where a center of a virtual sub-pixel 14a of a pitch Pp obtained by dividing the optical aperture pitch Ps into 17 equal portions and a center of the optical aperture 20 crosses the viewing distance plane, the position being different from an actual pixel position of the flat display portion. Since a direction in which respective cameras are arranged is a cyclic direction of the optical apertures in the optical plate 20, it is an oblique direction to a direction in which pixels are arranged on the flat display portion.

Figure 12A:
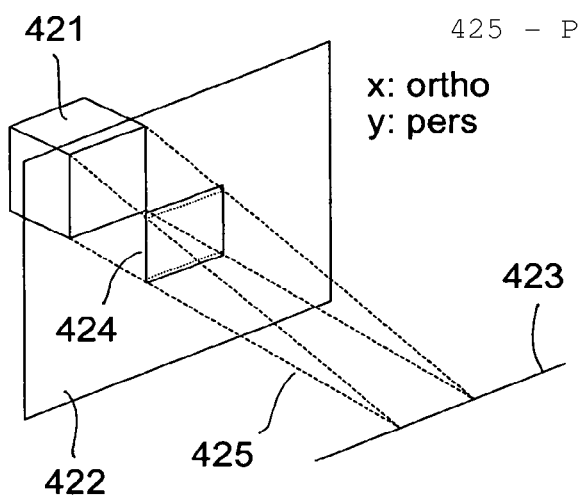
FIG. 12A is a diagram showing a method for constituting a parallax image and a stereoscopic image in a 1-dimensional IP system under a condition of having sets of parallel light beams according to the first and second embodiments.
Figure 12B:
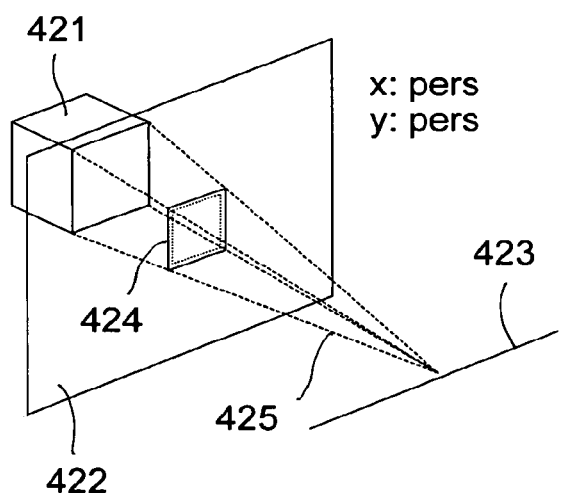
FIG. 12B is a diagram showing a method for constituting a parallax image and a stereoscopic image in a multiview system according to the first and second embodiments.

FIGS. 12A and 12B show methods for configuring a parallax image and a stereoscopic image in a one-dimensional IP system with sets of parallel light rays and in a multiview system. An object (a subject) to be displayed 421 is projected on a projection plane 422 put at the same position as a plane on which the optical plate of the stereoscopic display apparatus is actually placed. At that time, in the parallel light ray one-dimensional IP system, the object 421 is projected along projection lines 425 directed to a projection center line 423 positioned in front thereof (the center in a vertical direction) in parallel with the projection plane 422 and within the viewing distance plane such that a vertical direction (y direction) is perspective projection (capitalized as "pers" in FIG. 12A) and a horizontal direction (x direction) is orthographic projection (described as "ortho" in FIG. 12A). The projection lines do not cross each other in a horizontal direction but cross each other on the projection center line in a vertical direction. Respective projection directions correspond to parallax numbers but respective directions are not allocated with the same angle but they are set to form equal spaces on the viewing distance plane (the projection center line 423). That is, such a constitution is equivalent to a constitution that shootings are performed while a camera is being moved on the projection center line 423 in parallel at equal spaces (an orientation of the camera is fixed). FIG. 12B shows a projection method performed in the multiview system where perspective projection is made at a projection center point.

Figure 13:
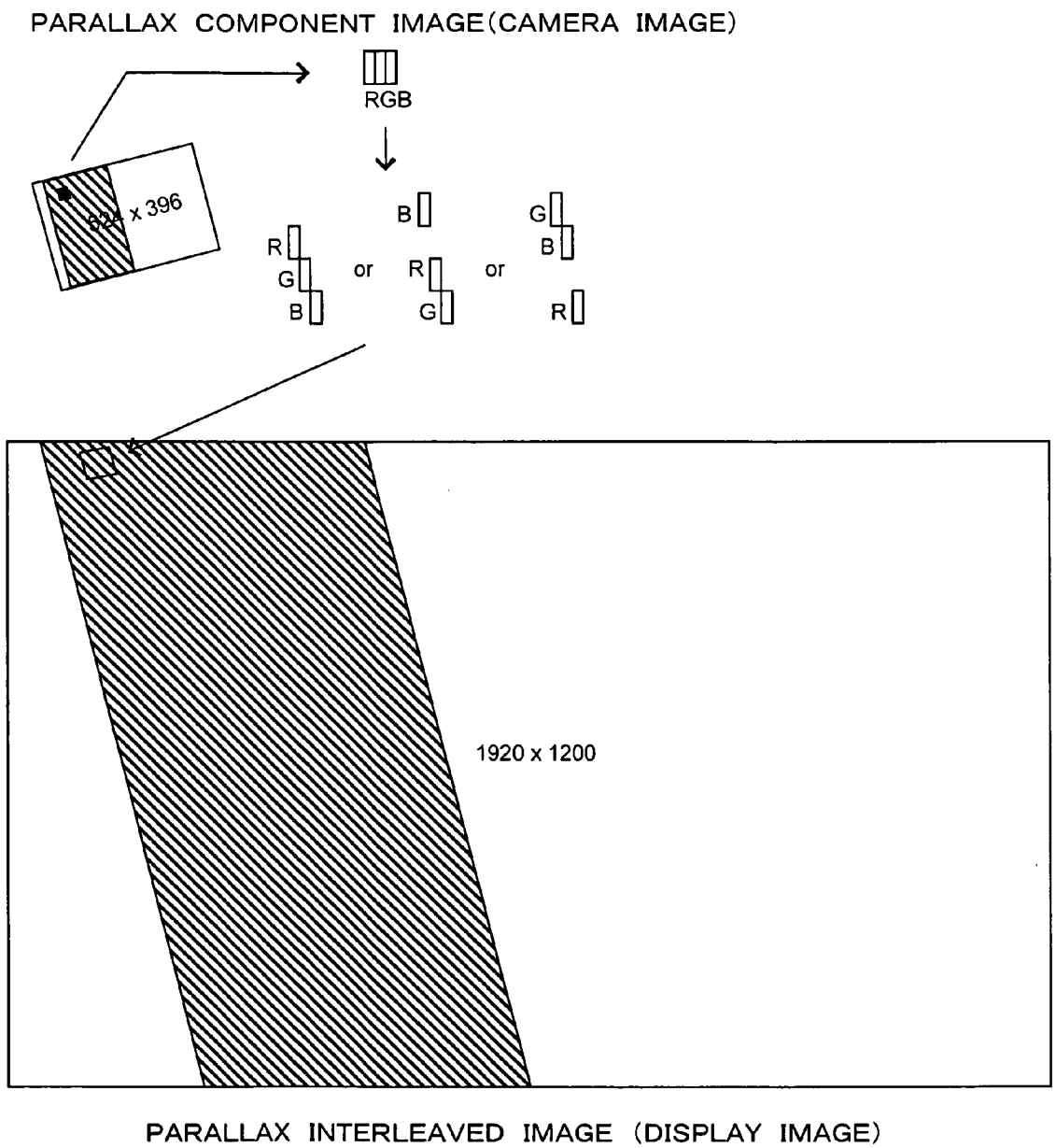
FIG. 13 is a conceptual diagram showing a method for arranging, in a parallax interleaved image (an elemental image array), images (parallax component images) corresponding to one direction in the stereoscopic image display apparatus of a 1-dimensional IP system according to the second embodiment.

FIG. 13 is a conceptual diagram showing a method for arranging an image (parallax component image) corresponding to one direction on a parallax interleaved image (elemental image array) in the one-dimensional IP system. In case of n=4 and a parallax interleaved image size of 1920×1200, a parallax component image has a size of 524×396. The parallax component image can be simply produced with a resolution at a stereoscopic display time using square pixels and utilizing a square arrangement like one of a type where optical apertures in the optical plate extend vertically. Each pixel in the parallax component image is divided to sub-pixels where are arranged obliquely according to a position. A neighboring pixel on the parallax component image is arranged at a position where it has been moved by four pixels in a lateral direction and by one pixel in a vertical direction. A range of the parallax component image defined by a shaded portion is arranged in a shaded portion on the parallax interleaved image at spacings of about four pixels in a divisional manner.

Figure 15:
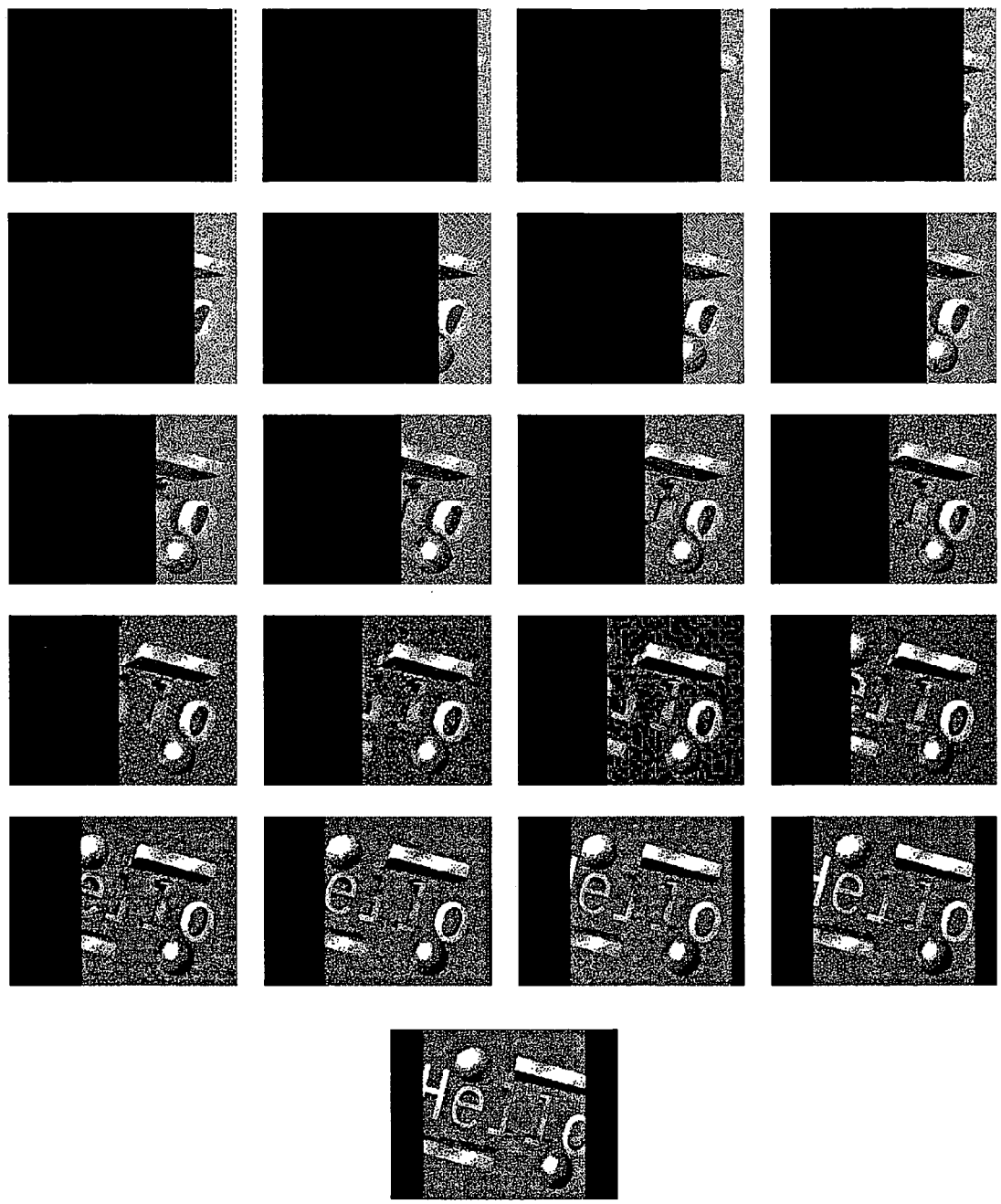
FIG. 15 is a diagram showing one example of a parallax component image group obtained in the stereoscopic image display apparatus according to the second embodiment.
Figure 16:
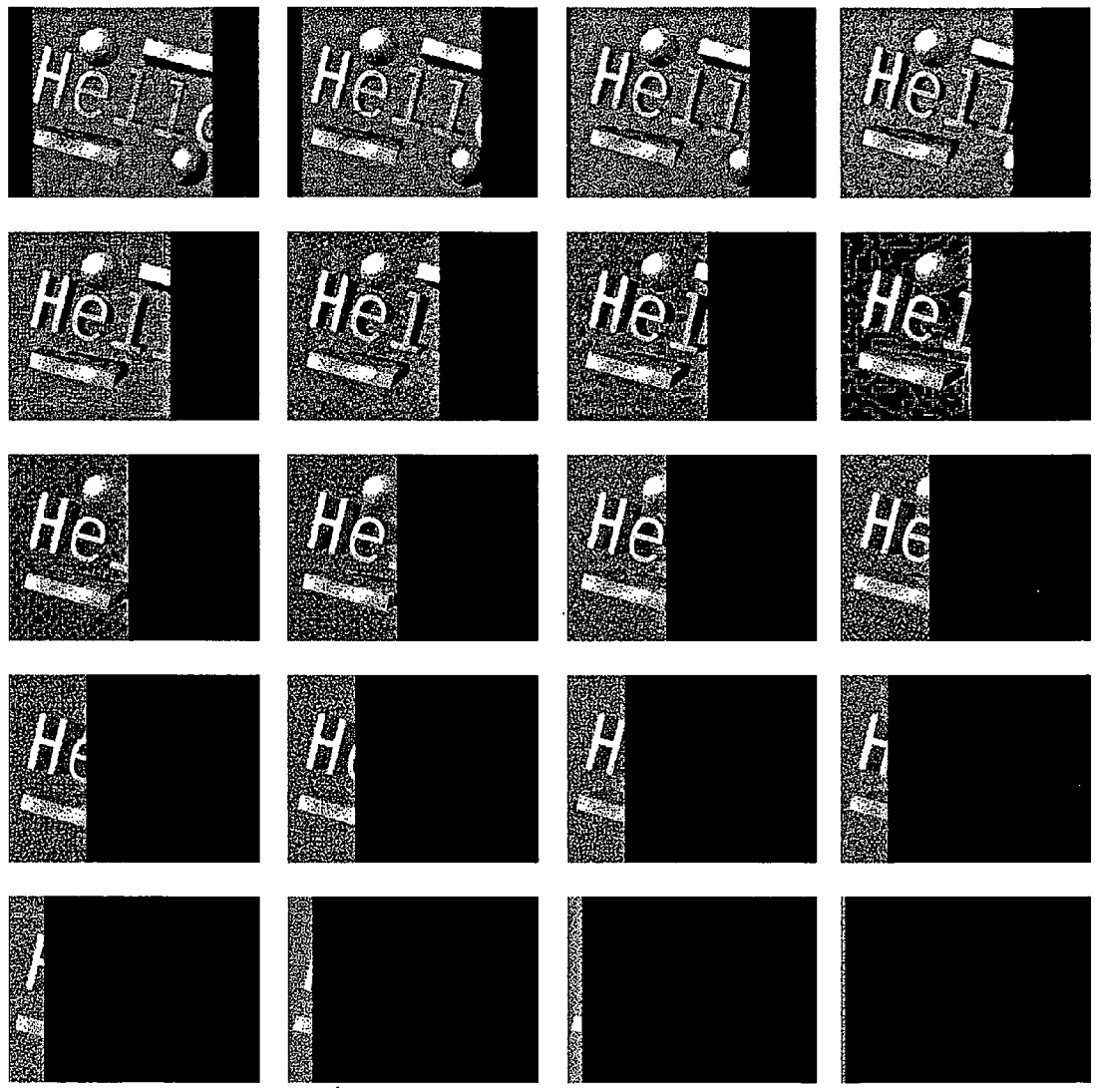
FIG. 16 is a diagram showing one example of a parallax component image group obtained in the stereoscopic image display apparatus according to the second embodiment.
Figure 17:
FIG. 17 is a diagram showing one example of a parallax interleaved image (an elemental image array) in the stereoscopic image display apparatus according to the second embodiment.

An arrangement table for parallax component images in a one-dimensional IP system of n=4 and the number of parallaxes=17 is shown in FIG. 14. In FIG. 14, 41 sheets of parallax component images each have a size of 524×396 and they are arranged on a parallax interleaved image (a size of 1920×1200) in a distributing manner within a range shown in the arrangement table for each sub-pixel. In case of the CG rendering, respective parallax component images can be rendered in the range shown in the arrangement table. Examples of images of 41 view point images rendered on only a required range at 20 view points on a left side eye and at a central view point are shown in FIG. 15. Examples of images of 41 view point images rendered on only a required range at 20 view points on a right eye side are shown in FIG. 16. An example of a parallax interleaved image obtained by composing the 41 parallax component images shown in FIG. 15 and FIG. 16. When the image is displayed on the flat display portion and it is viewed through the optical plate, a stereoscopic image with square pixels and a square arrangement can be observed or viewed.

According to each embodiment of the present invention, an amount of image processing can be prevented from increasing and excellent displaying characteristics can be obtained.

The present invention can be applied not only to a stereoscopic image display apparatus but also to a stereoscopic display of a print.

Incidentally, the present invention is not limited to the embodiments as they are, and the invention may be implemented while respective constituent elements in the embodiments are modified within departing from the scope and sprite of the invention.

The invention may be implemented variously according to proper combination of a plurality of constituent elements disclosed in the embodiments. For example, some constituent elements may be removed from all the constituent elements shown in the embodiments. Further, constituent elements which belong to different embodiments, respectively, may be properly combined to one another.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A stereoscopic image display apparatus comprising:
a flat display device having approximately square pixels squarely arranged on a flat display plane, each of the pixels being formed of three sub-pixels with an approximately rectangular shape; and
an optical plate which is disposed in front of the display device and has optical apertures which extend linearly in the same direction as a diagonal line of a rectangle obtained by connecting n (n =2, 3, . . .) pieces of the pixels in the same direction as a long axis of the sub-pixel, and is configured to control directions of light rays from the pixels,
wherein the flat display plane of the flat display device is divided into groups by sub-pixel, each of the groups is configured to display an elemental image and corresponds to each of the optical apertures in the optical plate, and
an average value of pitches of the elemental images is larger than m (m =1,2,3 . . .) times a length of a diagonal line of a rectangle obtained by connecting n pieces of the pixels in the same direction as a short axis of the sub-pixel and the pitch of the optical apertures in the optical plate is equal to the m times the length of the diagonal line of the rectangle obtained by connecting n pieces of the pixels laterally.

2. A stereoscopic image display apparatus according to claim 1, wherein vertical and lateral arrangement directions of the pixels arranged in the square manner on the flat display device are set in an oblique direction to a rectangular frame of the display portion on the whole stereoscopic image display apparatus, and the optical apertures in the optical plate are arranged in parallel with left and right ends of the display portion on the whole stereoscopic image display apparatus.

3. A stereoscopic image display apparatus according to claim 1, wherein vertical and lateral arrangement directions of the pixels arranged in the square manner on the flat display device are set in a vertical and parallel direction to a rectangular frame of the display portion on the whole stereoscopic image display apparatus, and the optical apertures in the optical plate are arranged in an oblique direction to left and right ends of the display portion of the whole stereoscopic image display apparatus.

4. A stereoscopic image display apparatus according to claim 2, wherein a shape of a whole display region on the flat display device is substantially coincident with a shape of the rectangular frame of the display portion on the whole stereoscopic image display apparatus.

5. A stereoscopic image display apparatus comprising:
a flat display device having approximately square pixels squarely arranged on a flat display plane, each of the pixels being formed of three sub-pixels with an approximately rectangular shape; and
an optical plate which is disposed in front of the display device and has optical apertures which extend linearly in the same direction as a diagonal line of a rectangle obtained by connecting n (n =2, 3, . . .) pieces of the pixels in the same direction as a long axis of the sub-pixel, and is configured to control directions of light rays from the pixels,
wherein the flat display plane of the flat display device is divided into groups by sub-pixel, each of the groups is configured to display an elemental image and corresponds to each of the optical apertures in the optical plate, and
an average value of pitches of the elemental images is equal to m (m =1,2,3 . . .) times a length of a diagonal line of a rectangle obtained by connecting n pieces of the pixels in the same direction as a short axis of the sub-pixel and the pitch of the optical apertures in the optical plate is smaller than m times the length of the diagonal line of the rectangle obtained by connecting n pieces of the pixels laterally.

6. A stereoscopic image display apparatus according to claim 5, wherein vertical and lateral arrangement directions of the pixels arranged in the square manner on the flat display device are set in an oblique direction to a rectangular frame of the display portion on the whole stereoscopic image display apparatus, and the optical apertures in the optical plate are arranged in parallel with left and right ends of the display portion on the whole stereoscopic image display apparatus.

7. A stereoscopic image display apparatus according to claim 5, wherein vertical and lateral arrangement directions of the pixels arranged in the square manner on the flat display device are set in a vertical and parallel direction to a rectangular frame of the display portion on the whole stereoscopic image display apparatus, and the optical apertures in the optical plate are arranged in an oblique direction to left and right ends of the display portion of the whole stereoscopic image display apparatus.

8. A stereoscopic image display apparatus according to claim 6, wherein a shape of a whole display region on the flat display device is substantially coincident with a shape of the rectangular frame of the display portion on the whole stereoscopic image display apparatus.

9. A stereoscopic image display method which displays a stereoscopic image using a stereoscopic image display apparatus provided with a flat display device having approximately square pixels squarely arranged on a flat display plane, each of the pixels being formed of three sub-pixels with an approximately rectangular shape, and an optical plate which is disposed in front of the display device and has optical apertures which extend linearly in the same direction as a diagonal line of a rectangle obtained by connecting n (n =2, 3, . . .) pieces of the pixels in the same direction as a long axis of the sub-pixel, and is configured to control directions of light rays from the pixels, where the flat display plane of the flat display device are divided into groups by sub-pixels, each of the groups is configured to display an elemental image and corresponds to each of the optical apertures in the optical plate, the method comprising:
arranging image information and parallax information such that pixels with a square shape having a length of one side of $(1+n^2)^{1/2} \times$(a pixel pitch on the flat display device)$\times$m (m=1, 2, 3, . . . ) are put in a square arrangement.

* * * * *